United States Patent
Lühr et al.

(10) Patent No.: US 11,260,753 B2
(45) Date of Patent: Mar. 1, 2022

(54) MOTOR VEHICLE

(71) Applicant: Volkswagen Aktiengesellschaft, Wolfsburg (DE)

(72) Inventors: Kord H. Lühr, Wolfenbüttel (DE); Gerd Penshorn, Edemissen (DE); Claus-Peter Brückner, Braunschweig (DE); Per Ulrich, Braunschweig (DE); Andreas Ortner, Wahrenholz (DE); Hannes Haupt, Braunschweig (DE); Bastian Bartels, Wolfsburg (DE)

(73) Assignee: VOLKSWAGEN AKTIENGESELLSCHAFT, Wolfsburg (DE)

( * ) Notice: Subject to any disclaimer, the term of this patent is extended or adjusted under 35 U.S.C. 154(b) by 511 days.

(21) Appl. No.: 16/027,483

(22) Filed: Jul. 5, 2018

(65) Prior Publication Data
US 2019/0009677 A1   Jan. 10, 2019

(30) Foreign Application Priority Data
Jul. 5, 2017   (DE) ...................... 10 2017 211 418.5

(51) Int. Cl.
*H02J 7/00*   (2006.01)
*B60L 1/00*   (2006.01)
(Continued)

(52) U.S. Cl.
CPC ................. *B60L 1/00* (2013.01); *B60L 1/006* (2013.01); *E05F 15/611* (2015.01); *E05F 15/77* (2015.01);
(Continued)

(58) Field of Classification Search
CPC ......... B60L 1/00; B60L 1/006; E05F 15/611; E05F 15/77; G07C 9/00182;
(Continued)

(56) References Cited

U.S. PATENT DOCUMENTS 8,947,202 B2   2/2015   Tucker et al. ............... 340/5.61
9,524,599 B2   12/2016  Lin et al.
(Continued)

FOREIGN PATENT DOCUMENTS

| CN | 101974991 A | 2/2011 | ............. B60R 26/04 |
| CN | 201991319 U | 9/2011 | ............. B60R 25/00 |

(Continued)

OTHER PUBLICATIONS

German Office Action, Application No. 102017211418.5, 5 pages, dated Mar. 21, 2018.
(Continued)

*Primary Examiner* — Zixuan Zhou
(74) *Attorney, Agent, or Firm* — Slayden Grubert Beard PLLC

(57) ABSTRACT

The present invention relates to a motor vehicle that is equipped with an electrical door closing mechanism, a radio-based signal receiver and a control unit, wherein the door closing mechanism can be actuated after receiving and verifying an access authorization code by electrical signals that are generated by a control unit. The motor vehicle possesses an electrical charging apparatus accessible from the outside so that a signal generator that is provided to generate the access code can be charged from the electrical system of the motor vehicle in the event of an insufficient charge. Furthermore, the invention describes a method for charging a signal generator that can be executed using the device according to the invention.

15 Claims, 2 Drawing Sheets

(51) Int. Cl.
*H02J 7/02* (2016.01)
*E05F 15/611* (2015.01)
*E05F 15/77* (2015.01)
*G07C 9/00* (2020.01)
*H02J 50/10* (2016.01)
*H02J 7/34* (2006.01)

(52) U.S. Cl.
CPC ........ *G07C 9/00182* (2013.01); *H02J 7/0045* (2013.01); *H02J 7/025* (2013.01); *E05Y 2201/434* (2013.01); *E05Y 2400/30* (2013.01); *E05Y 2400/614* (2013.01); *E05Y 2400/664* (2013.01); *E05Y 2400/85* (2013.01); *E05Y 2900/531* (2013.01); *H02J 7/342* (2020.01); *H02J 50/10* (2016.02); *Y02T 90/16* (2013.01)

(58) Field of Classification Search
CPC .... G07C 9/00309; H02J 7/0045; H02J 7/025; H02J 50/10; H02J 7/00712; H02J 2310/48; E05Y 2201/434; E05Y 2400/30; E05Y 2400/614; E05Y 2400/664; E05Y 2400/85; E05Y 2900/531; Y02T 90/16; H04W 76/14; H04W 4/80; H04W 12/04; B60R 25/00; H04M 1/72412
USPC .................. 320/108, 109; 307/104; 701/22; 340/5.61
See application file for complete search history.

(56) References Cited

U.S. PATENT DOCUMENTS

| | | | |
|---|---|---|---|
| 9,725,069 B2 | 8/2017 | Krishnan | |
| 10,266,131 B2 | 4/2019 | Eling et al. | |
| 10,312,721 B2 | 6/2019 | Orris et al. | |
| 2002/0109582 A1 | 8/2002 | Mooney et al. | 340/5.65 |
| 2010/0075655 A1 | 3/2010 | Howarter et al. | 455/420 |
| 2011/0202218 A1* | 8/2011 | Yano | G08C 21/00 701/22 |
| 2011/0291614 A1 | 12/2011 | Yeh | 320/108 |
| 2014/0242971 A1 | 8/2014 | Aladenize et al. | 455/420 |
| 2014/0316612 A1 | 10/2014 | Banter et al. | 701/2 |
| 2015/0048927 A1 | 2/2015 | Simmons | 340/5.61 |
| 2015/0077036 A1 | 3/2015 | Leabman et al. | 320/101 |
| 2016/0020632 A1 | 1/2016 | Lickfelt et al. | 320/108 |
| 2018/0069415 A1* | 3/2018 | Zugasti Hays | H02J 50/10 |
| 2018/0086212 A1* | 3/2018 | Dudar | B60L 53/12 |
| 2018/0342883 A1* | 11/2018 | Inskeep | B60L 53/53 |
| 2018/0351388 A1* | 12/2018 | Orris | H02J 7/025 |

FOREIGN PATENT DOCUMENTS

| | | | | |
|---|---|---|---|---|
| CN | 103688294 A | 3/2014 | ........... | B60R 16/037 |
| CN | 105701886 A | 6/2016 | ........... | B60R 25/25 |
| CN | 107301142 A | 10/2017 | ............. | G06F 13/40 |
| CN | 109004697 A | 12/2018 | ............. | B60R 25/40 |
| DE | 102006021172 A1 | 11/2007 | ............. | B60R 25/24 |
| DE | 102007014179 A1 | 9/2008 | ............. | B60R 25/00 |
| DE | 202011050270 U1 | 8/2011 | ............. | B60R 11/02 |
| DE | 102011121310 A1 | 6/2013 | ............. | B60K 35/00 |
| DE | 102013016887 A1 | 6/2014 | ............. | B60L 11/18 |
| DE | 112013000504 T5 | 10/2014 | ............. | B60R 25/01 |
| DE | 102013009070 A1 | 12/2014 | ............. | E05B 53/00 |
| DE | 102014104032 A1 | 9/2015 | ............. | B60R 25/00 |
| DE | 202016105621 U1 | 11/2016 | ............. | B60R 25/00 |
| DE | 102015211026 A1 | 12/2016 | ............. | G08C 17/02 |
| DE | 102016106371 A1 | 10/2017 | ............. | B60R 25/00 |
| JP | 2013102642 A | 5/2013 | ............. | B60R 25/01 |
| JP | 2014174739 A | 9/2014 | ............. | B60R 25/24 |
| TW | 201637908 A | 11/2016 | ............. | B60R 25/24 |
| WO | 2016/076735 A1 | 5/2016 | ............. | H02J 50/10 |

OTHER PUBLICATIONS

BMW, "Manual Smartphone Cradle," URL: https://www.bmw-motorrad.ca/content/dam/bmwmotorradnsc/common/downloads/smartphone_cradle/Manual_Smartphone_Cradle.pdf.asset.1489147654563.pdf, 31 pages (German w/ English translation), Mar. 31, 2016.

Extended European Search Report, Application No. 18175056.3, 10 pages, dated Dec. 5, 2018.

Anonymous, "Charging Devices—Voltage and Amperage," URL: https://electronics.stackexchange.com/questions/29259/charging-devices-voltage-and-amperage/328834, 5 pages, Apr. 4, 2012.

Anonymous, "TV in the Motorhome: Accessories for the Best TV Experience on the Move," ProMobil, URL: https://www.promobil.de/tv-spezial-fernseh-zuebhoer-macht-fernsehen-im-wohnmobil-erst-perfekt/, 7 pages (German language w/ English translation), Oct. 12, 2016.

European Office Action, Application No. 18175056.3, 6 pages, dated Aug. 28, 2019.

Chinese Office Action, Application No. 201810729943.6, 21 pages, dated Sep. 24, 2020.

* cited by examiner

MOTOR VEHICLE

CROSS-REFERENCE TO RELATED APPLICATIONS

This application claims priority to DE Application No. 10 2017 211 418.5 filed Jul. 5, 2017, the contents of which are hereby incorporated by reference in their entirety.

TECHNICAL FIELD

The present invention relates to a motor vehicle that is equipped with an electrical door closing mechanism, a radio-based receiver for receiving an access authorization code, and a charging device for charging an electrical signal generator. Furthermore, the invention relates to a method by means of which a signal generator can be charged to open the motor vehicle using the disclosed motor vehicle.

BACKGROUND

Radio-based electrical door closing mechanisms are considered standard today in motor vehicles. At the same time, the traditional mechanical ignition lock is dispensed with in many motor vehicles and is replaced with a simple start/stop button.

With the omission of the traditional ignition lock, the mechanical key is also unnecessary. Instead, electrical signal generators are used to open and close doors.

These signal generators were originally integrated into the mechanical key. In the interim, other designs have been used such as credit card-like signal generators.

In addition, the employed signal generators frequently have supplementary functions that go beyond the actual opening and closing of the motor vehicle. In such signal generators it is possible to save information to personalize the motor vehicle. After the motor vehicle is opened, selected parameters such as the adjustment of the seats can already be adapted to the key and hence to the user.

Future solutions envision entirely dispensing with opening the motor vehicle with a special motor-vehicle-specific signal generator. Instead, cell phones will be used, in particular smart phones, that are equipped with the assistance of special software. This software makes it possible to generate an access authorization code followed by transmission to the motor vehicle. Typically, the software is realized in the form of a so-called app. The cell phone thereby assumes the function of the signal generator.

Independent of the signal generator design, the problem can occur in daily operation that the signal generator has an insufficient charge for opening the motor vehicle. A solution must therefore be sought by means of which the driver can enter the vehicle despite the failure of the radio-based signal generator.

A mechanical key is disclosed in the document DE 10 2006 021 172 for this purpose that is integrated into the electronic key. In an emergency, the emergency key is removed from the actual key. The motor vehicle can then be opened using a conventional mechanical lock.

A similar solution is proposed in the document DE 10 2007 014 179. Here as well, a mechanical emergency key is disclosed. However, the arrangement of the mechanical key in the housing of the electronic key as well as the provided lock deviate from DE 10 2006 021 172. An improved retention of the emergency key in the key housing is thereby achieved so that the emergency key does not fall out when dropped.

In the document DE 10 2013 009 070, a mechanical solution for emergency unlocking of the motor vehicle is proposed. In the event of a failure of the electronic key, unlocking the associated door can be achieved with a movement of the exterior mirror. For this, the external mirror is connected by a Bowden cable to the door lock. If the mirror is moved to a specific position such as forward, the corresponding door lock unlocks.

In the document U.S. Pat. No. 8,947,202 B2, a solution is described for opening a motor vehicle with the assistance of a smart phone as the signal generator. For this, a Bluetooth-based connection between the smart phone and the motor vehicle is established, wherein a solution with an authentication using a second smart phone is documented as an advantageous embodiment. A solution for the instance in which the first smart phone and/or the second smart phone has an insufficient charge is not disclosed.

SUMMARY

Despite the described known solutions, an object still remains of finding an economical solution that makes it possible to open a motor vehicle even when the electronic signal generator is incapable of generating and transmitting the access authorization code needed for opening because the charge is too low. This object is relevant in particular when using a cell phone or a smart phone as the signal generator.

According to the invention, this object is solved with a motor vehicle according to claim 1. Embodiments of the invention are described in the following and the respective dependent claims. In addition, a method by means of which the motor vehicle according to the invention can be opened even when the signal generator is insufficiently charged is disclosed.

The technical effect that is achieved by the disclosed solution is that a motor vehicle equipped with an electrically actuatable door closing mechanism offers a charging option when the signal generator is insufficiently charged, such that the motor vehicle can be opened, e.g., after a minimum amount of electrical energy is drawn.

BRIEF DESCRIPTION OF THE DRAWINGS

In the following, the invention will be further explained using exemplary embodiments. In the drawings.

Figure 1:
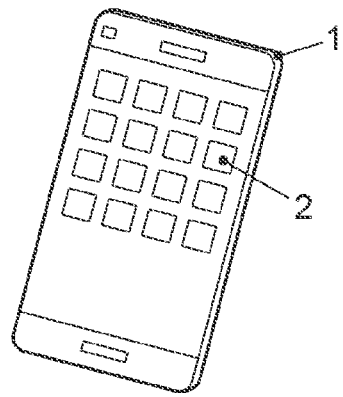
FIG. 1: shows a signal generator in the form of a smart phone equipped with a key app.

The motor vehicle described according to embodiments herein has an electrical door closing mechanism, an, e.g. radio-based, signal receiver and at least one control unit. If a driver approaches the motor vehicle, he may gain access to the motor vehicle by actuating a signal generator. In addition to the known remote keys, in particular cell phones in the form of smart phones may used as the signal generator in some embodiments. Smart phones are gaining increasing importance in this regard. They can be enhanced with a corresponding software application as a digital key and thereby assume the function of the signal generator.

If the driver finds that the signal generator charge is insufficient, access may initially be impossible for him. As a solution, some embodiments propose a charging apparatus attached in/or on the motor vehicle that is accessible from the outside. This charging apparatus can be electrically connected to the signal generator in some embodiments. A control unit located in the motor vehicle may in some embodiments be designed such that it can control the charging process until a charge sufficient for opening the motor vehicle is reached.

In another embodiment, the charging apparatus is designed according to the functional principle of induction. For this, coils are installed at easily accessible locations of the motor vehicle.

To be charged, the signal generator can be placed on one of the coils. Locations for the arrangement of such a coil are located in particular in the region of the black tint on the front windshield or behind corresponding body parts.

In an alternative embodiment, the connection between the charging apparatus and the signal generator is established by means of a cable (connection). This cable in some embodiments may be arranged in a cable compartment protected from environmental influences. With the assistance of a plug, the charging cable can be connected to the signal generator as needed.

In an embodiment, the at least one control unit is designed such that it enables an authorization of the signal generator. Depending on the type of signal generator, different authorization techniques are possible in this regard. Passive transponders are suitable in particular. If such a transponder is brought into the vicinity of the charging apparatus, the control unit recognizes that the signal generator is authorized to be charged. In this context, both a solution in which the transponder is designed as an independent unit, for example in the form of a key fob, as well as a solution in which the transponder is permanently attached in or on the signal generator would be in line with the invention. If the signal generator is a cell phone such as a smart phone, a transponder arranged in the interior of the device would be a possible suitable solution.

In an embodiment, the at least one control unit is designed such that it enables a limitation of the amount of energy that can be drawn from the electrical system of the motor vehicle. For this, different drawing strategies can be saved in the control unit. In a purely time-based drawing strategy, drawing is ended after a defined period. A new charging cycle can only be started after a certain waiting period, wherein the pause between two charging cycles may become larger with each cycle. In an alternative embodiment, the drawable amount of energy is controlled. After a predefined amount is reached, the charging cycle is ended. In an embodiment, a new charging cycle can only be started after a specific waiting period expires in this case as well.

In another embodiment, the control unit is designed such that the remaining voltage in the electrical system of the motor vehicle can be checked before the start of the charging process (self-protection). For this, the control has a function for monitoring the electrical system voltage. If it falls below a predefined value, external charging is not released or is terminated.

In another embodiment, a function for outputting status messages is implemented in the control unit. Such status messages can in particular be output after a successful contact with the signal generator, a successful authorization, as well as the termination or interruption of a charging process.

In the following, further exemplary embodiments are explained with reference to the attached drawings.

FIG. 1 shows a commercially available smart phone 1 that is intended to be used as a signal generator to open the motor vehicle. A corresponding app 2 is installed on this device that functions as a digital key. In addition to actually opening and closing the motor vehicle, this app is able to perform additional functions (such as transmitting personalized information in order to preset motor vehicle functions or settings).

Figure 2:
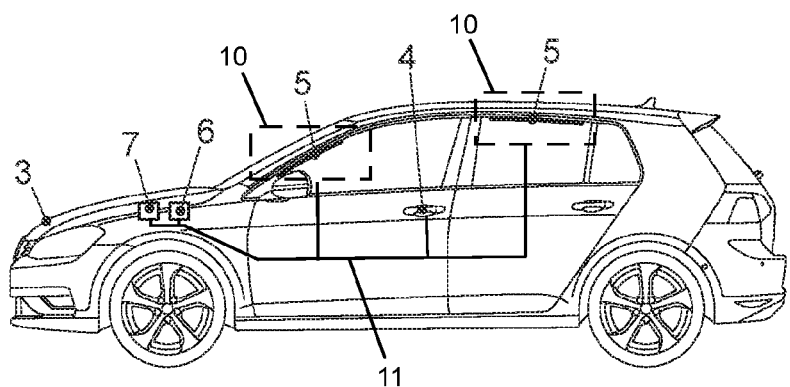
FIG. 2: shows a design of a motor vehicle with arrangement options for the coils for inductive charging.
Figure 3:
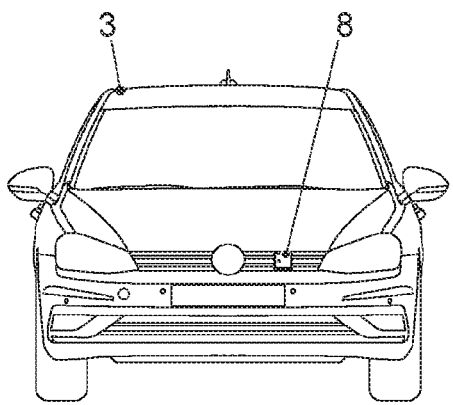
FIG. 3: shows a front view of a motor vehicle with an optional arrangement of a cable as the connection to the signal generator.
Figure 4:
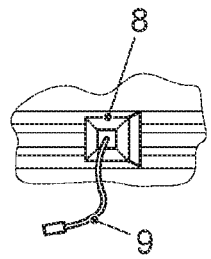
FIG. 4: shows a detail view of a cable device for connecting the signal generator.

FIGS. 2, 3 and 4 show the design of the motor vehicle as well as suitable versions of arrangements for the charging apparatus.

FIG. 2 portrays a solution in which the motor vehicle 3 possesses a plurality of coils 5 for inductively charging a smart phone 1. The coils 5 are in one example attached in the region of the black tint of the windshield, or behind suitable, non-metal body parts.

FIGS. 3 and 4 disclose an alternative arrangement of the charging device. In this case, a charging cable 9 is provided for connecting the signal generator 1 to a charging device. This charging cable may be arranged behind a flap in a charging cable compartment 8 in order to protect it from the influences of weather.

Figure 5:
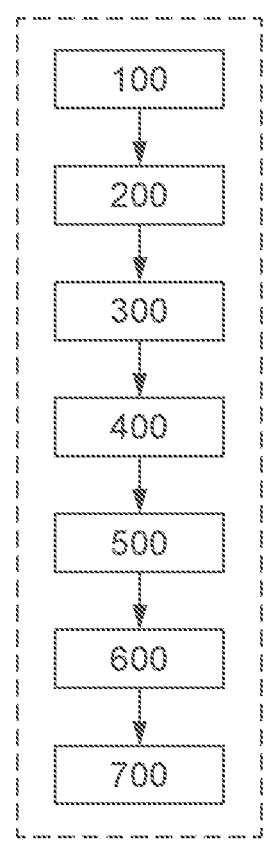
FIG. 5: shows a method for using the charging device.

The method that can be performed with the assistance of the disclosed device will be described in the following with reference to FIG. 5.

The starting point for the method is the approach of the driver to his motor vehicle 3 and his desire to open it with the assistance of the signal generator 1. If the driver finds that the signal generator 1 is insufficiently charged, or respectively is perhaps already completely dead, opening of the motor vehicle 3 is unsuccessful. Recharging is necessary in order to nonetheless enter the motor vehicle 3.

Depending on the type and features of the signal generator 1, there are different alternative approaches. If it is a cell phone 1 and has an apparatus for inductive charging, the owner, in a first method step 100, approaches one of the available charging coils 5 with the device, or respectively places it on the corresponding surface. Alternatively, he opens a charging cable compartment 8 and connects the cell phone to the charging cable hidden therein in method step 100.

Once the contact is established, a status signal is initially output to the user in a step 200. This notifies him that the necessary electrical contact is established. The authorization of the signal generator 1 occurs in another method step 300. If this is successful and the electrical system of the motor vehicle 1 has sufficient voltage for a charging process, a corresponding status signal is output in step 400 in an embodiment.

The charging process is started in step 500. In this method step as well, the user is notified by the outputting of a status signal in step 600 in an embodiment.

After the expiration of the charging time, or respectively after transmission of a defined amount of energy, the charging process is ended (step 700). In another method step 800, the user is notified of this end in an embodiment by a corresponding status signal that is output by the control unit 6.

After the conclusion of the charging process, it is possible to open the motor vehicle 3. If the charge of the signal generator 1 is still insufficient, the process can be restarted by disconnecting and reconnecting the signal generator 1.

Other variations to the disclosed embodiments can be understood and effected by those skilled in the art in practicing the claimed invention, from a study of the drawings, the disclosure, and the appended claims. In the claims, the word "comprising" does not exclude other elements or steps, and the indefinite article "a" or "an" does not exclude a plurality. A single processor, module or other unit or device may fulfil the functions of several items recited in the claims.

The mere fact that certain measures are recited in mutually different dependent claims or embodiments does not indicate that a combination of these measured cannot be used to advantage. Any reference signs in the claims should not be construed as limiting the scope.

REFERENCE SIGN LIST

1 Cell phone (signal generator)
2 Software application (app)
3 Motor vehicle
4 Door closing mechanism
5 Coil
6 Signal receiver
7 Control unit
8 Charging cable compartment
9 Charging cable
10 Charging apparatus
11 Electrical system
100 Contacting the signal generator
200 Output of a status signal
300 Authorization
400 Output of a status signal
500 Start of the charging process
600 Output of a status signal
700 End of the charging process

What is claimed is:

1. A motor vehicle comprising:
an electrically actuatable door closing mechanism;
a signal receiver for receiving an access authorization code; and
at least one control unit for evaluating the received access authorization code, and for generating control signals for the door closing mechanism, wherein
a charging apparatus is provided that is accessible from outside the motor vehicle for electrically charging a signal generator; and
the at least one control unit provides a control of an amount of energy that is transmitted to the signal generator in the context of the charging process by an electrical system of the motor vehicle; wherein the at least one control unit measures and controls
the drawing of electrical energy, so that the charging process is ended when the signal transmitter has reached a charge level sufficient to open a door of the motor vehicle; wherein
the charging apparatus is designed according to the functional principle of inductive charging and comprises one or more coils, arranged on an interior side of a window pane of the motor vehicle.

2. The motor vehicle according to claim 1, wherein authorization of the signal generator can be performed by the at least one control unit.

3. The motor vehicle according to claim 1, wherein the at least one control unit allows to limit the amount of energy to be transmitted.

4. The motor vehicle according to claim 1, wherein a determination of the charge in the electrical system of the motor vehicle is performed with the assistance of the at least one control unit, and when a charge limit value is not met, the charging process is not activated or the charging process is ended during an ongoing charging process.

5. The motor vehicle according to claim 1, wherein the at least one control unit is configured to output status information.

6. The motor vehicle of claim 1, wherein the one or more coils are arranged in the region of a black tint on a windshield of the motor vehicle.

7. A method for charging a signal generator, wherein:
the signal generator is connected to a charging apparatus of a motor vehicle, that is accessible from the outside of the motor vehicle; and
controlled by a control unit located in the motor vehicle, a charging process of the signal generator is performed by using energy in an electrical system of the motor vehicle; wherein the control unit measures and controls
the drawing of electrical energy, so that the charging process is ended when the signal transmitter has reached a charge level sufficient to open a door of the motor vehicle; wherein
the charging apparatus is designed according to the functional principle of inductive charging and comprises one or more coils, arranged on an interior side of a window pane of the motor vehicle.

8. The method of claim 7, wherein the control unit provides an authorization of the signal generator before the start of the charging process.

9. The method of claim 8, wherein a status signal is output by means of the control unit to confirm a successful authorization of the signal generator.

10. The method of claim 7, wherein a test of the electrical system voltage of the motor vehicle is performed by the control unit.

11. The method of claim 7, wherein the transmitted amount of energy is controlled during the charging process by the control unit.

12. The method of claim 7, wherein a signal to confirm the end of the charging process is output by the control unit.

13. The method according to claim 7, wherein the signal generator is electrically charged by the charging apparatus according to the principle of induction.

14. A method for charging a signal generator by a motor vehicle, comprising:
detecting, by a control unit of the motor vehicle, the signal generator when in proximity of a charging apparatus of the vehicle, which charging apparatus is accessible from the outside of the motor vehicle;
authorizing the signal generator by the control unit; and
if the signal generator is authorized, charging the signal generator by using energy of an electrical system of the motor vehicle; further comprising testing of an electrical system voltage of an internal electrical system of the motor vehicle by the control unit before charging the signal generator; and commencing charging the signal generator only when the electrical system voltage of the internal electrical system corresponds to or exceeds a predefined voltage threshold value.

15. A motor vehicle comprising:
an electrically actuatable door closing mechanism;
an internal electrical system;
a signal receiver for receiving an access authorization code from a signal generator;
at least one control unit for evaluating the received access authorization code, and for generating control signals for the door closing mechanism; and a charging apparatus that is accessible from outside the motor vehicle for electrically charging the signal generator; wherein the at least one control unit is configured to:
   determine, if the signal generator is authorized;
   determine an electrical system voltage of the internal electrical system; and
   if the signal generator is authorized and the electrical system voltage of the internal electrical system corresponds to or exceeds a predefined voltage threshold value, charge the signal generator by using energy of the internal electrical system of the motor vehicle.

\* \* \* \* \*